(12) United States Patent
Sena

(10) Patent No.: US 7,159,679 B2
(45) Date of Patent: Jan. 9, 2007

(54) CRUISE CONTROL INDICATOR

(75) Inventor: Carlos Sena, Greenfield, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 339 days.

(21) Appl. No.: 10/427,072

(22) Filed: Apr. 30, 2003

(65) Prior Publication Data

US 2004/0216937 A1    Nov. 4, 2004

(51) Int. Cl.
*B60K 31/08* (2006.01)

(52) U.S. Cl. ............... 180/176; 180/170; 180/219; 340/425.5

(58) Field of Classification Search ........ 180/170, 180/176, 219, 171, 175; 123/349; 340/425.5, 340/427, 461, 438
See application file for complete search history.

(56) References Cited

U.S. PATENT DOCUMENTS

| | | | |
|---|---|---|---|
| 4,189,706 A | 2/1980 | Knox | |
| 4,796,716 A * | 1/1989 | Masuda | ............ 180/176 |
| 4,894,641 A | 1/1990 | Yang | |
| 5,027,103 A | 6/1991 | Weiner | |
| 5,371,487 A | 12/1994 | Hoffman et al. | |
| 5,463,370 A | 10/1995 | Ishikawa et al. | |
| 5,477,208 A | 12/1995 | Henderson et al. | |
| 5,691,695 A | 11/1997 | Lahiff | |
| 5,815,072 A | 9/1998 | Yamanaka et al. | |
| 6,008,732 A | 12/1999 | Lam | |
| 6,116,369 A | 9/2000 | King et al. | |
| 6,125,320 A | 9/2000 | Hellmann et al. | |
| 6,223,103 B1 * | 4/2001 | Patil | ............ 701/1 |
| 6,226,588 B1 | 5/2001 | Teramura et al. | |
| 6,289,332 B1 * | 9/2001 | Menig et al. | ............ 707/1 |
| 6,294,990 B1 * | 9/2001 | Knoll et al. | ............ 340/461 |
| 6,299,320 B1 * | 10/2001 | Kato et al. | ............ 362/23 |
| 6,324,463 B1 * | 11/2001 | Patel | ............ 701/93 |
| 6,360,158 B1 | 3/2002 | Hanawa et al. | |
| 6,396,394 B1 * | 5/2002 | Suzuki et al. | ............ 340/425.5 |
| 6,407,663 B1 | 6/2002 | Huggett | |
| 6,470,256 B1 | 10/2002 | Cikalo et al. | |
| 6,472,977 B1 | 10/2002 | Pochmuller | |
| 6,693,523 B1 * | 2/2004 | Abel et al. | ............ 340/461 |
| 6,696,932 B1 * | 2/2004 | Skibinski et al. | ............ 340/438 |
| 6,777,633 B1 * | 8/2004 | Kondo et al. | ............ 200/310 |
| 2001/0022265 A1 | 9/2001 | Ase et al. | |
| 2002/0014565 A1 | 2/2002 | Ase et al. | |
| 2004/0134701 A1 * | 7/2004 | Iwaki | ............ 180/170 |

\* cited by examiner

*Primary Examiner*—J. Allen Shriver
(74) *Attorney, Agent, or Firm*—Michael Best & Friedrich LLP

(57) ABSTRACT

A motorcycle comprising a frame, a front wheel coupled to the frame, a rear wheel coupled to the frame and an engine adapted to propel the motorcycle. The motorcycle also includes a cruise control system including an off condition, an on condition, and a set condition operable to maintain the motorcycle at a desired speed. A cruise control indicator is electrically connected to the cruise control system and is operable to emit light of a first color when the cruise control is in the on condition and light of a second color when the cruise control is in the set condition.

14 Claims, 4 Drawing Sheets

CRUISE CONTROL INDICATOR

BACKGROUND OF THE INVENTION

The present invention generally relates to motorcycles, and particularly to motorcycles that include cruise control systems.

Motorcycles include a throttle control built into one of the hand grips, and rotation of the throttle control produces a corresponding adjustment of the engine throttle. During a long trip, the hand of a motorcycle rider may become fatigued by maintaining the throttle control in the desired position. The hand fatigue makes the rider uncomfortable and can result in undesirable speed variations.

To solve these problems, motorcycles are often equipped with a cruise control system that automatically maintains the speed of the motorcycle at a desired cruising speed. Motorcycle cruise control systems often include an indicator that informs the rider when the cruise control system is set, but fails to inform the rider when the cruise control system is activated. Other cruise control systems include one indicator that indicates when the cruise control system is activated and a second separate indicator that indicates when the cruise control system is set.

SUMMARY OF THE PREFERRED EMBODIMENT

The present invention provides a motorcycle including a cruise control system that maintains the motorcycle at a desired cruising speed. The cruise control system includes an indicator that emits a colored light when the cruise control is turned on and emits differently-colored light when the cruising speed has been set.

In one embodiment of the invention, the cruise control indicator includes first and second LEDs that emit a first color and a second color, respectively. In another aspect of the invention, the cruise control system includes a solid-state switch that transitions the cruise control system between the various modes of operation. Preferably, both lights are positioned behind the same indicator so that multiple indicators are not required.

BRIEF DESCRIPTION OF THE DRAWINGS

The detailed description particularly refers to the accompanying figures in which.

Figure 1:
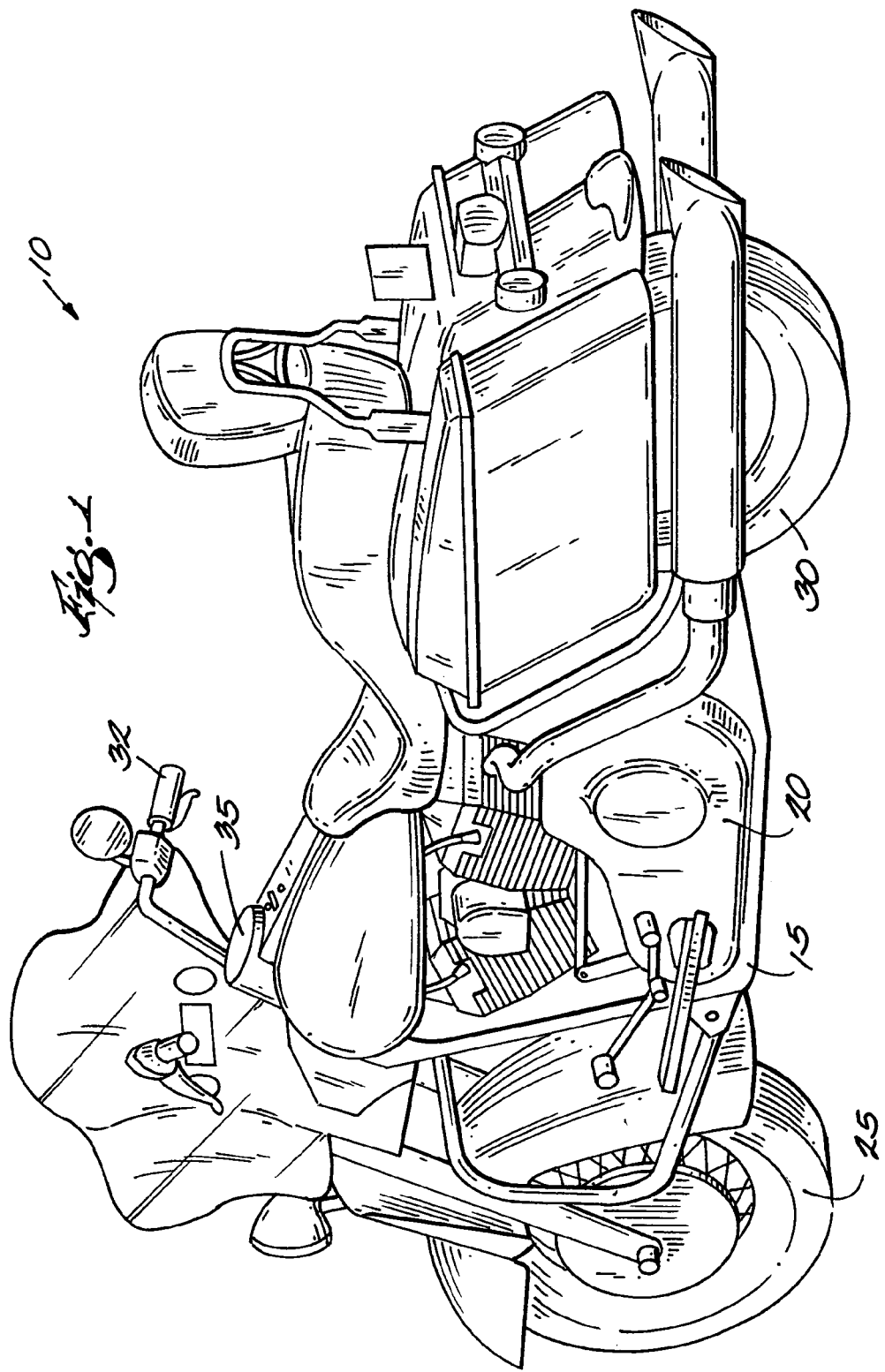
FIG. 1 is a perspective view of a motorcycle embodying the cruise control system of the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION OF THE DRAWINGS

FIG. 1 illustrates a motorcycle 10 including a frame 15 that supports an engine/transmission assembly 20, a front wheel 25, and a rear wheel 30. The front wheel 25 is pivotally coupled to the frame 15 to allow a rider to steer the motorcycle 10. The rear wheel 30 is coupled to the engine/transmission assembly 20 such that operation of the engine/transmission assembly 20 rotates the rear wheel 30 to propel the motorcycle 10.

Also included on the motorcycle 10 are various gauges, controls, and indicators that are used to both control and monitor the operation of the motorcycle. For example, the motorcycle 10 includes a speedometer 35 that indicates the speed at which the motorcycle 10 is traveling, and a throttle control 32 that controls the throttle of the engine/transmission assembly 20.

Figure 3:
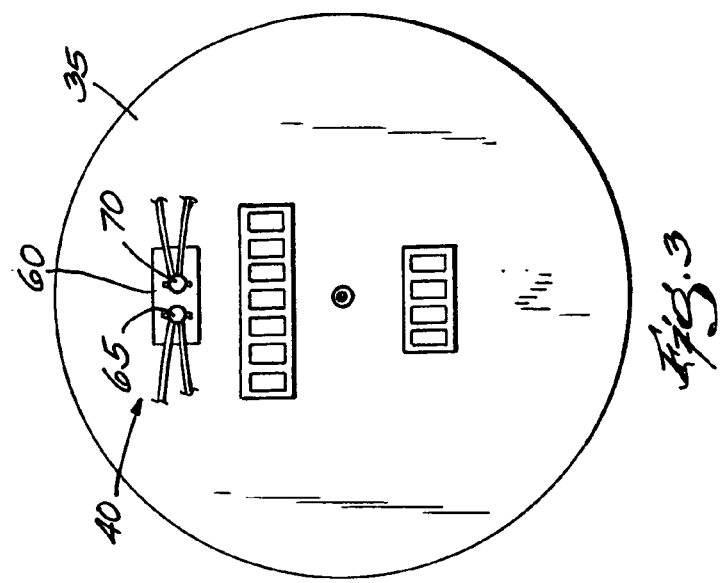
FIG. 3 is an enlarged perspective view of the speedometer of FIG. 2, illustrating the speedometer with the faceplate removed.

In addition, the motorcycle 10 includes a cruise control system (not shown). The cruise control system, when in use, monitors the speed of the motorcycle 10 and adjusts the engine throttle to maintain a desired cruising speed. As shown in FIG. 3, the cruise control system includes an indicator 40 that informs the rider of the cruise control system's status. The indicator 40 is capable of indicating that the system is in the ON condition or the OFF condition, as well as indicating that the cruise control has been SET. Setting the cruise control defines the speed that the cruise control system should maintain. The illustrated cruise control indicator 40 is located within the speedometer 35.

One of ordinary skill in the art will realize that the cruise control indicator 40 can be placed in many different locations. For example, another construction positions the indicator 40 within a tachometer. Still other constructions position a stand-alone indicator in an instrument panel. Yet another construction provides an indicator positioned on one of the handle bars of the motorcycle 10.

Figure 2:
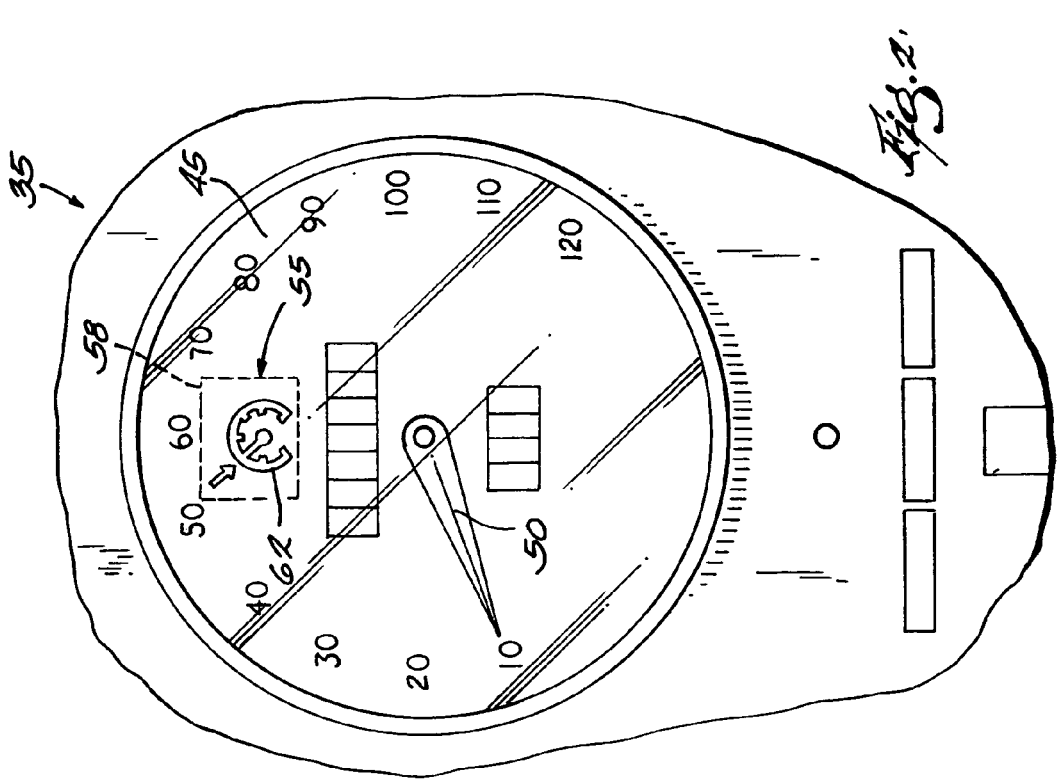
FIG. 2 is an enlarged top view of a speedometer of the motorcycle of FIG. 1, illustrating a faceplate and window.

As shown in FIG. 2, the speedometer 35 includes a faceplate 45 and a needle 50 that rotates to indicate the speed of the motorcycle 10. The speedometer 35 is located directly in front of the rider allowing the rider to quickly and easily confirm the cruise control status and the speed of the motorcycle 10.

The face plate 45 includes a window 55 through which light is visible. The window 55 may include a transparent or translucent cover (shown in broken lines as 58) or may include a series of cutouts 62 in the faceplate 45 that form a design. The window 55 may be square, rectangular, round, or any other shape desired. For example, the window 55 illustrated in FIG. 2 is irregularly shaped to match the proposed ISO (International Organization for Standardization) standard for a cruise control indicator 40. In another construction, the proposed ISO symbol is printed on the cover 58, and the light passes substantially around the proposed ISO symbol rather than through it as with the cutouts 62. Other symbols can be used to represent the cruise control system, however, it is not necessary to use any symbol at all.

With reference to FIG. 3, the indicator 40 includes a circuit board 60 having a first light-emitting diode (LED) 65 and a second LED 70 positioned behind the window 55 (FIG. 2). Each LED 65, 70 includes an optic that is sized and positioned to emit light in the desired direction. Unless otherwise indicated, the term "LED" as used herein refers to both the diode element and the optic in combination. The first LED 65 emits light of a first color when powered, while the second LED 70 emits light of a second color different from the first color when powered. The light emitted by either LED 65, 70 passes through the window 55 to illuminate the window 55 in the color of the LED. One of ordinary skill will realize that a clear or translucent window 55 (i.e., one that does not filter the color of the emitted light) would be preferred as it will not adversely affect the color or intensity of the light emitted. However, colored or tinted windows 55 are contemplated and could be used with certain LEDs 65, 70 to achieve the desired result.

In another construction, the two LEDs 65, 70 are replaced by a single multi-color LED. The multi-color LED emits light of a first color when a first voltage or current magnitude is applied and emits light of a second color when a second voltage or current magnitude is applied.

The cruise control system is operable in one of at least three modes or conditions. The modes include OFF, ON, and SET. In the OFF condition the system cannot operate to control vehicle speed, and the LEDs 65, 70 are both de-energized leaving the indicator 40 in a dark or unlit state. In the ON condition the cruise control system is active but still does not control vehicle speed. In the ON condition, current is supplied to the first LED 65, while the second LED 70 remains de-energized. Thus, the indicator 40 emits a first color of light through the window 55. The cruise control system, when in the SET condition actively controls the speed of travel of the motorcycle. In the SET condition, the first LED 65 is de-energized, while current is supplied to the second LED 70. Thus, the indicator 40 emits a second color light through the window 55. In this manner, a single indicator 40 is able to convey the status of the cruise control system in the OFF, ON, and SET conditions.

Other configurations, such as COAST and ACCELERATE, could also be conveyed to the rider using the present system. For example, the first LED 65 could be made to blink in the first color for COAST and the second LED 70 could blink in the second color for ACCELERATE. Furthermore, additional LEDs could be added to convey additional information if desired. Thus, the system is not limited to only two colors or two LEDS.

Figure 4:
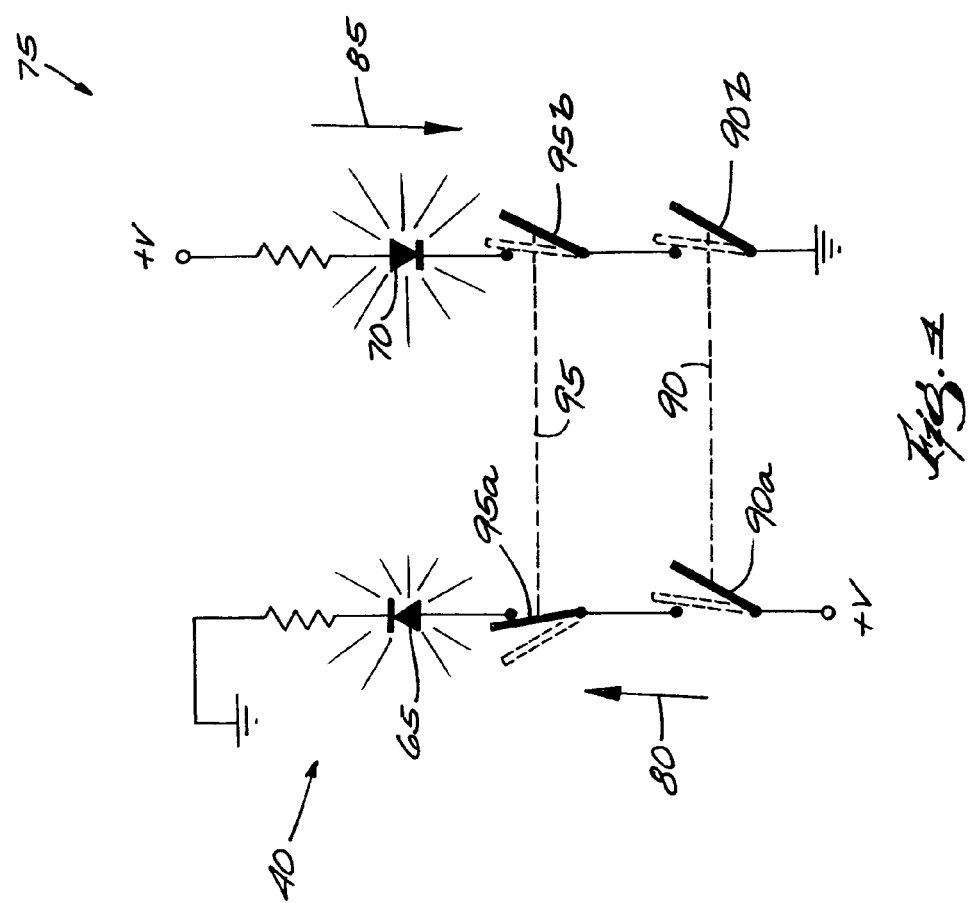
FIG. 4 is a circuit diagram illustrating one embodiment of the cruise control indicator.

Turning to FIG. 4, one possible circuit 75 capable of operating the two LEDs 65, 70 is illustrated. The circuit 75 includes a first circuit path 80 configured to control the first LED 65 and a second circuit path 85 configured to control the second LED 70. The circuit 75 also includes two interconnected pairs of switches. The first set of switches 90 includes two normally open switches 90a, 90b and the second set of switches 95 includes a normally closed switch 95a in the first circuit path 80 and a normally open switch 95b in the second circuit path 85. It should be noted that the term "interconnected" as used herein indicates that the switches act as a pair when transitioning between ON, OFF, and SET. A mechanical or electrical connection between the two switches could achieve this result. Likewise, a control device could control each switch independently. In such a construction, the control device "interconnects" the switches.

The switches 90, 95 of FIG. 2 are arranged in the OFF configuration. When the rider transitions the cruise control from the OFF configuration to the ON configuration, the first set of switches 90 move to their alternate positions (shown in broken lines). In other words, both switches 90a, 90b move to the closed position. In this position, a complete circuit path through the first LED 65 exists and the LED 65 is illuminated. The second circuit path 85 is still open, thus preventing the second LED 70 from emitting light.

When the rider transitions from the ON configuration to the SET configuration the second set of switches 95 move to their alternate positions (shown in broken lines). The normally closed switch 95a in the first circuit path 80 opens and the normally open switch 95b in the second circuit path 85 closes. The open switch 95a in the first circuit path 80 breaks the circuit and de-energizes the first LED 65. However, closing the switch 95b in the second circuit path 85 completes the second circuit path 85 to illuminate the second LED 70.

While FIG. 4 illustrates one way of controlling the cruise control indicator 40 using mechanical switches 90, 95, it should be clear that solid-state circuitry is well suited to the task of illuminating the indicator 40. Solid-state circuitry could be located on the circuit board 60 with the LEDs 65, 70 or could be disposed in another location. In addition, a microprocessor-based control could be used to control the LEDs 65, 70 if desired. Constructions using solid-state circuitry and microprocessor-based controls are designed or programmed based on a logic diagram.

Figure 5:
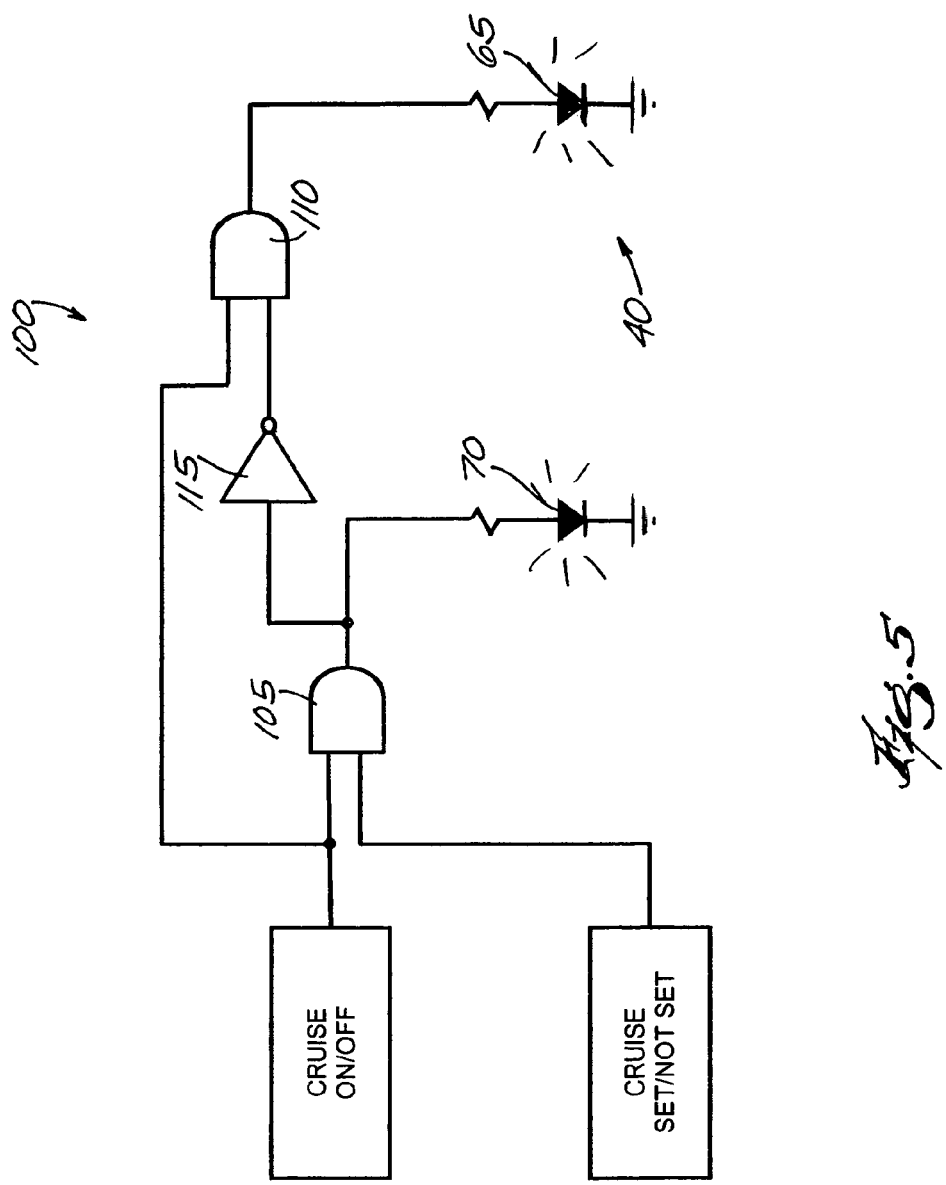
FIG. 5 is a logic diagram illustrating the cruise control indicator.

Turning to FIG. 5, one possible logic diagram 100 suitable for controlling the LEDs 65, 70 is shown. The logic diagram 100 includes a first AND gate 105, a second AND gate 110 and a NOT gate 115. The following table describes the operation of the indicator logic diagram 100, where a "1" represents ON or SET, while a "0" represents OFF or NOT SET.

| Cruise Condition | Cruise ON/OFF | Cruise SET/NOT SET | LED 1 | LED 2 |
|---|---|---|---|---|
| OFF | OFF (0) | NOT SET (0) | OFF (0) | OFF (0) |
| OFF | OFF (0) | SET (1) | OFF (0) | OFF (0) |
| ON | ON (1) | NOT SET (0) | ON (1) | OFF (0) |
| SET | ON (1) | SET (1) | OFF (0) | ON (1) |

As illustrated in the foregoing table, neither LED 65, 70 can be illuminated with the cruise control in the OFF condition. However, configuring the cruise control in the ON condition illuminates the first LED 65. Setting the cruise control (i.e., configuring the cruise control in the SET condition) illuminates the second LED 70, while simultaneously switching off the first LED 65.

In operation, the cruise control is in the OFF condition when the motorcycle engine 20 starts. When the rider wishes to use the cruise control he/she manipulates an actuator (not shown) that transitions the cruise control system from the OFF condition to the ON condition. In the ON condition, the first LED 65 emits light of the first color (e.g., red) that is visible through the window 55. Thus, the indicator 40 provides feedback to the rider indicating that the cruise control is ready to be set. The rider accelerates to the desired speed by adjusting the throttle control 32 and then manipulates an actuator (not shown) to set the cruise control. Once the cruise control is set, the first LED 65 turns off, and the second LED 70 emits light of a second color (e.g., green) visible through the window 55. The cruise control system moves from the SET condition to the ON condition when the throttle control 32 or brakes are moved by the rider, as is known in the art. The cruise control system moves from the ON to the OFF condition when the rider moves the actuator to the OFF position.

One or more actuators may be used to transition the cruise control system between its various conditions, with a single three-position actuator being the most convenient. However, additional actuators may be required if additional cruise control conditions such as COAST or ACCELERATE are desired.

Although the invention has been described in detail with reference to certain preferred embodiments, variations and modifications exist within the scope and spirit of the invention as described and defined in the following claims.

What is claimed is:

1. A cruise control system including an off condition, an on condition, and a set condition, the cruise control system comprising:
    an indicator selectively operable to emit light having one of a first color and a second color; and
    a user-operable control movable to configure the cruise control system in one of an off condition, an on condition, and a set condition, the indicator emitting light of the first color when the cruise control system is in the on condition and emitting light of the second color when the cruise control system is in the set condition.

2. The cruise control system of claim 1, wherein the indicator includes a first light-emitting device operable to emit light of the first color and a second light-emitting device operable to emit light of the second color.

3. The cruise control system of claim 2, wherein the first light-emitting device is an LED and the second light-emitting device is an LED.

4. The cruise control system of claim 1, further comprising a panel including a display window positioned to at least partially cover the indicator such that the light emitted by the indicator is visible through the display window.

5. The cruise control system of claim 4, wherein the display window is shaped to resemble a proposed ISO symbol for a cruise control indicator.

6. The cruise control system of claim 1, wherein one of the first color and the second color is green and the other of the first color and the second color is red.

7. The cruise control system of claim 1, further comprising a selector operable to configure the cruise control system in one of the off condition, the on condition, and the set condition, and wherein the indicator emits no light when configured in the off condition.

8. The cruise control system of claim 1, further comprising at least one switch, the switch adjustable to configure the cruise control system in one of the off condition, the on condition, and the set condition.

9. The cruise control system of claim 8, wherein the switch is a solid state switch.

10. A method of indicating the status of a cruise control system comprising:
    emitting light of a first color from an indicator when the cruise control system is in an on condition;
    changing the configuration of the cruise control system from the on condition to a set condition; and
    emitting light of a second color from the indicator when the cruise control system is in the set condition.

11. The method of claim 10, further comprising turning off the light of a first color from the indicator after changing the configuration of the cruise control from the on condition to the set condition.

12. A cruise control system operable in an off condition, an on condition, and a set condition, the cruise control system comprising:
    a faceplate including a display side and a back side;
    a cutout perimeter defining a cutout portion that provides an illumination path between the back side and the display side;
    a first LED positioned adjacent the back side and operable to emit light of a first color when the cruise control is in the on condition, at least a portion of the emitted light passing through the cutout portion; and
    a second LED positioned adjacent the back side and operable to emit light of a second color when the cruise control is in the set condition, at least a portion of the emitted light passing through the cutout portion, the second color being different from the first color.

13. The cruise control of claim 12, further comprising a user-operable control movable to configure the cruise control system in one of the off condition, the on condition, and the set condition.

14. The cruise control system of claim 12, wherein one of the first color and the second color is green and the other of the first color and the second color is red.

* * * * *